United States Patent [19]

Kitahara et al.

[11] Patent Number: 4,542,190

[45] Date of Patent: Sep. 17, 1985

[54] CIS-1,4-POLYISOPRENE RUBBER COMPOSITION

[75] Inventors: Shizuo Kitahara, Kawaguchi; Toshihiro Fujii; Nagatoshi Sugi, both of Yokohama, all of Japan

[73] Assignee: Nippon Zeon Co Ltd, Tokyo, Japan

[21] Appl. No.: 390,931

[22] Filed: Jun. 22, 1982

[30] Foreign Application Priority Data

Jun. 29, 1981 [JP]   Japan .................................. 56-100993

[51] Int. Cl.[4] ..................... C08C 19/40; C08C 19/20; C08C 19/22
[52] U.S. Cl. .................................. 525/332.6; 525/192; 525/327.3; 525/343; 525/349; 525/382
[58] Field of Search ...................... 525/387, 388, 327.3, 525/346, 332.6, 333.1, 192, 379, 381, 382

[56] References Cited

U.S. PATENT DOCUMENTS

| | | | |
|---|---|---|---|
| 2,876,214 | 3/1959 | Wheelock | 525/387 |
| 3,312,636 | 4/1967 | Rizzo | 525/382 |
| 3,324,051 | 6/1967 | Lal | 528/419 |
| 3,397,178 | 8/1968 | Shackelford | 525/382 |
| 3,484,388 | 12/1969 | Wofford | 528/419 |
| 4,341,672 | 7/1982 | Hsieh | 525/387 |

*Primary Examiner*—Christopher A. Henderson
*Attorney, Agent, or Firm*—Sherman & Shalloway

[57] ABSTRACT

A cis-1,4-polyisoprene rubber composition capable of giving a vulcanizate having improved strength, said composition comprising (1) a synthetic cis-1,4-polyisoprene rubber having epoxy groups, (2) a compound having at least two primary amino groups, and (3) a sulfur vulcanization system.

5 Claims, No Drawings

CIS-1,4-POLYISOPRENE RUBBER COMPOSITION

This invention relates to a synthetic cis-1,4-polyisoprene rubber composition having improved strength after vulcanization. More specifically, this invention relates to a rubber composition prepared by compounding synthetic cis-1,4-polyisoprene rubber having epoxy groups with a compound having at least two primary amino groups and a sulfur vulcanization system.

Synthetic cis-1,4-polyisoprene rubber has a chemical structure similar to natural rubber, and is used as a substitute for natural rubber in tires and many other fields. It has been desired however to improve it further because it has some defects in its properties both in the unvulcanized and vulcanized states in comparison with natural rubber. One defect of the polyisoprene rubber is that with the same compounding recipe, it has a lower tensile stress than natural rubber, and increasing of its tensile stress by, for example, increasing the amount of the vulcanization system results in a marked reduction in strength. This defect is especially pronounced in a so-called pure rubber compounding formulation not containing a reinforcing agent (e.g., carbon) and a filler, but is also observed in a formulation containing the reinforcing agent and filler.

One known method for improving the green strength of a diene-type rubber such as cis-1,4-polyisoprene rubber comprises compounding the diene-type rubber with an epoxy group-containing rubber obtained by copolymerizing a monomer containing an epoxy group, such as glycidyl methacrylate, and an epoxy-curing agent (U.S. Pat. No. 4,094,831). However, if an isoprene/glycidyl methacrylate copolymer and a primary diamine compound, for example, are blended with cis-1,4-polyisoprene rubber and the blend is vulcanized, a vulcanizate having a high tensile strength and excellent strength cannot be obtained.

An attempt has been made, on the other hand, to impart a long-lasting antioxidative effect by reacting the epoxy groups introduced into a diene-type rubber with an N,N'-substituted-p-phenylene diamine-type antioxidant to bond the antioxidant directly to the molecular chains of the rubber (British Pat. No. 1,221,595).

It is an object of this invention to provide a cis-1,4-polyisoprene rubber composition capable of giving a vulcanizate having a high tensile stress and excellent strength.

The present inventors have undertaken a great deal of efforts in order to achieve this object, and found that such compounds as N,N'-substituted-p-phenylenediamine compounds and p-amino-diphenylamine known as an antioxidant are ineffective, but that if a compound having at least two primary amino groups, such as p-phenylenediamine which has no antioxidant action is blended with cis-1,4-polyisoprene rubber having epoxy groups and the blend is vulcanized with a sulfur vulcanization system, superior effects can be obtained.

Thus, according to this invention, there is provided a rubber composition comprising (1) synthetic cis-1,4-polyisoprene rubber having epoxy groups, (2) a compound having at least two primary amino groups and (3) a sulfur vulcanization system.

The epoxy group-containing synthetic cis-1,4-polyisoprene rubber used in this invention can be obtained by epoxidizing cis-1,4-polyisoprene rubber having a cis-1,4 linkage content of at least 90%, preferably at least 95% and crystallizability by stretching, which is obtained by polymerizing an isoprene monomer with a known catalyst such as a Ziegler-type catalyst or an organic alkali metal catalyst, by a known epoxidizing method, for example by a method involving using a peracid. Preferably, the epoxy group-containing cis-1,4-polyisoprene rubber has an epoxy group content of 0.02 to 1.5, especially 0.1 to 1.0, per 100 isoprene monomer units. Desirably, it has a Mooney viscosity ($ML_{1+4, 100°C}$) of at least 30 in order to balance its processability with the various properties of its vulcanizate.

The compound having at least two primary amino groups having reactivity with epoxy groups, as used in this invention, is an aliphatic, alicyclic or aromatic primary polyvalent amino compound. Compounds known as curing agents for epoxy resins may be cited as examples. Specific examples of these compounds include ethylene diamine, $\alpha,\omega$-polymethylenediamines (e.g., hexamethylenediamine), diethylenetetramine, triethylenetetramine, bis-hexamethylene-triamine, pentamethylenehexamine, menthanediamine, 1,3-diaminocyclohexane, p-phenylenediamine, 4,4'-diaminodiphenylmethane, 4,4'-diaminodiphenyl ether, 4,4'-diaminodiphenyl sulfone, 3,3'-dichloro-4,4'-diaminodiphenylmethane, polyetherdiamine, polyamide curing agents obtained by reacting diamines (e.g., ethylenediamine) with divalent or polyvalent organic acids, and amino acids such as arginine.

The object of this invention can be achieved irrespective of whether the amount of this amino compound is one required for inducing crosslinkage between the epoxy groups of cis-1,4-polyisoprene rubber, or an excessively large one which does not easily induce crosslinkage. However, when the content of the epoxy groups is within the range specified above, the desirable amount of the amino compound is 0.05 to 3.0 parts by weight, preferably 0.1 to 2.0 parts by weight, per 100 parts by weight of the rubber.

There is no restriction on the method of adding the amino compound to cis-1,4-polyisoprene rubber. Usually, the addition is achieved by a solid-phase method which comprises mixing and kneading the rubber and the amino compound by using a mixer such as a roll or a Banbury mixer, or a liquid-phase method which comprises adding the amino compound, either as such or as a solution, to a solution of the rubber and mixing them into a solution.

The object of this invention cannot be achieved by merely blending the epoxy group-containing cis-1,4-polyisoprene rubber with the amino compound. The blend must be vulcanized with a vulcanization system in order to achieve the object of the invention. The vulcanization system denotes a system comprised of at least one of sulfur and sulfur-donor compounds, a vulcanization aid or activator, and a vulcanization accelerator. These materials can be properly selected from those which are normally used in the vulcanization of diene-type rubbers.

Examples of the sulfur-donor compounds usually employed include thiuram compounds such as tetramethylthiuram disulfide, and morpholine compounds such as morpholine disulfide. Zinc oxide and stearic acid are generally used as the vulcanization aid or activator. Examples of the vulcanization accelerators usually employed are guanidine-type accelerators such as diphenylguanidine, thiazole-type accelerators such as dibenzothiazyl disulfide and cyclohexylbenzothiazylsulfenamide, and thiuram-type accelerators such as tetramethylthiuram monosulfide and tetraethylthiuram disulfide.

The amount of the sulfur vulcanization system is not restricted, and may fall within the range of conventionally used amounts.

In addition to the sulfur vulcanization system, the composition of this invention may further include reinforcing materials such as various carbon blacks, silica, fillers such as calcium carbonate, process oils, processing aids, etc.

The addition of the above ingredients is effected in a mixer normally used in the rubber industry, such as a roll and a Banbury mixer. The resulting rubber compound stock is molded into a desired shape by using a machine such as a calender roll or an extruder, and then vulcanized to give a final rubber product.

Since the composition of this invention gives a vulcanizate having much improved tensile stress, tensile strength, tear strength and rebound, it can be used in the manufacture of various industrial parts such as tires and belts.

The following examples illustrate the present invention more specifically. All parts shown in these examples are by weight.

EXAMPLE 1

In each run, cis-1,4-polyisoprene rubber [Nipol IR 2200, a product made by Nippon Zeon Co., Ltd.; cis-1,4 linkage content more than 97%, Mooney viscosity ($ML_{1+4,\ 100°\ C.}$) 83], epoxy group-containing polyisoprene rubber A, epoxy group-containing polyisoprene rubber B, or a mixture of the aforesaid polyisoprene rubber and an isoprene/glycidyl methacrylate copolymer rubber (80/20) was mixed with each of the diamines shown in Table 1 at about 140° C. for 2 minutes in a Brabender plastograph (manufactured by Brabender OHG, West Germany). The mixture was blended with the various compounding agents shown in Table 2 on a small-sized roll to give a pure rubber compound stock (Runs Nos. 4 to 16).

The pure rubber compound stock was press-cured at 145° C. for each of the vulcanization times shown in Table 1 to form a vulcanized sheet having a thickness of 2 mm. Dumbbell-shaped No. 3 test specimens in accordance with JIS K-6301 were punched out from the sheet, and tested for mechanical properties at room temperature and a stretching speed of 500 mm/min.

For comparison, the same test was performed on polyisoprene rubber and natural rubber to which no diamine was added (Runs Nos. 1 to 3).

The results are shown in Table 1.

The epoxy group-containing polyisoprene rubber A was produced by dissolving 250 g of the above cis-1,4-polyisoprene rubber in 4 liters of benzene, adding 22 g of acetic acid and 51 g of 30% aqueous hydrogen peroxide with stirring, reacting them at room temperature for 3 hours, pouring the reaction mixture into about 10 liters of methanol to coagulate the product, and drying it under reduced pressure. The product contained 0.4 epoxy group per 100 isoprene units, and had a Mooney viscosity ($ML_{1+4,\ 100°\ C.}$) of 65.

The epoxy group-containing polyisoprene rubber B was produced in the same way as in the production of the epoxy group-containing polyisoprene rubber A except that the amount of acetic acid was changed to 11 g and the amount of 30% aqueous hydrogen peroxide to 26 g. It had a Mooney viscosity of 78 and contained 0.15 epoxy group per 100 isoprene units.

The isoprene-glycidyl methacrylate copolymer was produced by charging a pressure vessel with various polymerization reagents in accordance with the following polymerization recipe, repeating deaeration and nitrogen purging of the vessel, and then polymerizing the monomers at 60° C., stopping the polymerization after a conversion of 70% was reached, and then coagulating and drying the product in a conventional manner.

| Polymerization recipe | |
|---|---|
| Isoprene | 98.0 parts |
| Glycidyl methacrylate | 2.0 parts |
| Water | 200 parts |
| Sodium linear alkylbenzene-sulfonate | 3.0 parts |
| Sodium salt of a naphthalenesulfonic acid/formaldehyde condensate | 0.2 part |
| Tertiary dodecyl mercaptan | 0.25 part |
| Potassium persulfate | 0.3 part |

TABLE 1

| Run No. | Sample rubber | Additive (parts) | Compounding recipe | Vulcanization time (min.) |
|---|---|---|---|---|
| Comparison | | | | |
| 1 | Polyisoprene rubber | — | I | 15 |
| 2 | " | — | II | 14 |
| 3 | Natural rubber (RSS#3) | — | I | 10 |
| 4 | Polyisoprene rubber | Hexamethylenediamine (1.0) | I | 7 |
| 5 | Epoxy group-containing polyisoprene rubber A | — | I | 15 |
| 6 | Epoxy group-containing polyisoprene rubber A | N—isopropyl-N'—phenyl-p-phenylenediamine (1.0) | I | 14 |
| 7 | Epoxy group-containing polyisoprene rubber A | p-Aminodiphenylamine (1.0) | I | 12 |
| 8 | Polyisoprene rubber/isoprene-glycidyl methacrylate copolymer rubber mixture | Hexamethylenediamine (1.0) | I | 7 |
| Invention | | | | |
| 9 | Epoxy group-containing polyisoprene rubber B | Hexamethylenediamine (1.0) | I | 7 |
| 10 | Epoxy group-containing polyisoprene rubber B | p-Phenylenediamine (1.0) | I | 7 |
| 11 | Epoxy group-containing polyisoprene rubber B | p-Phenylenediamine (0.2) | I | 8 |
| 12 | Epoxy group-containing polyisoprene rubber B | m-Phenylenediamine (1.0) | I | 8 |
| 13 | Epoxy group-containing | p-Phenylenediamine (1.0) | I | 7 |

TABLE 1-continued

| | | | | |
|---|---|---|---|---|
| 14 | Epoxy group-containing polyisoprene rubber A | Propanediamine (0.5) | I | 7 |
| 15 | Epoxy group-containing polyisoprene rubber A | Tohmide #225X (1.0) | I | 8 |
| 16 | Epoxy group-containing polyisoprene rubber A | Arginine (1.0) | I | 8 |

| | Tensile test | | |
|---|---|---|---|
| Run No. | 300% tensile stress (kg/cm$^2$) | Tensile strength (kg/cm$^2$) | Elongation at break (%) |
| Comparison | | | |
| 1 | 24 | 180 | 600 |
| 2 | 30 | 64 | 330 |
| 3 | 33 | 235 | 610 |
| 4 | 25 | 213 | 620 |
| 5 | 25 | 196 | 610 |
| 6 | 24 | 177 | 600 |
| 7 | 26 | 204 | 600 |
| 8 | 25 | 136 | 550 |
| Invention | | | |
| 9 | 36 | 272 | 590 |
| 10 | 35 | 331 | 670 |
| 11 | 29 | 303 | 680 |
| 12 | 34 | 299 | 650 |
| 13 | 38 | 330 | 640 |
| 14 | 33 | 341 | 660 |
| 15 | 28 | 305 | 690 |
| 16 | 32 | 218 | 560 |

Note to Table 1
Tohmide #225X is a trademark for an epoxy resin curing agent produced by Fuji Chemical Industry Co., Ltd., Japan, which is a condensation product of a polyamine and a dimer acid of an unsaturated fatty acid having an amine value of 315.

Arginine is an amino acid of the following formula:

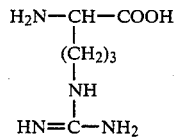

TABLE 2

| (pure rubber formulation) | | |
|---|---|---|
| Compounding agents | Recipe I | Recipe II |
| Sample rubber | 100 (parts) | 100 (parts) |
| Active zinc oxide | 3.3 | 4.0 |
| Stearic acid | 1.7 | 2.0 |
| Sulfur | 3.3 | 4.0 |
| NOCCELER F | 1.7 | 2.0 |
| 2,6-di-t-butyl-4-methylphenol | 1.0 | 1.0 |

(*): NOCCELER F is a tradename for a vulcanization accelerator made by Ohuchi Shinko Kagaku Kogyo K.K., which is a mixture of benzothiazoyl disulfide, diphenylguanidine and hexamethylenetetramine.

The following results can be seen from Table 1.

(i) With the same compounding recipe, the polyisoprene rubber has a lower 300% tensile stress than natural rubber (by a comparison of Run No. 1 with Run No. 3), and when its tensile stress is increased by increasing the amount of the vulcanization system according to recipe II (Run No. 2), its tensile strength is markedly reduced.

(ii) According to this invention (Runs Nos. 9 to 16), vulcanized rubbers similar in properties to natural rubber and having high 300% tensile stress and tensile strength can be obtained.

(iii) The improving effect is insufficient when hexamethylenediamine as a compound having reactivity with epoxy groups is added to the polyisoprene rubber not containing epoxy groups (Run No. 4) and a compound containing primary amino groups is not added to the polyisoprene rubber containing epoxy groups (Run No. 5).

(iv) The improving effect is also insufficient when an isoprene-glycidyl methacrylate copolymer is blended with the polyisoprene rubber in accordance with a prior art technique (U.S. Pat. No. 4,094,831) (Run No. 7).

(v) A comparison of

Run No. 6
[⌬—NH—⌬—NH—CH(CH$_3$)$_2$],

Run No. 7
[⌬—NH—⌬—NH$_2$] and

Run No. 13
[H$_2$N—⌬—NH$_2$]

shows that little or no improving effect is observed with the amine containing no primary amino group and the amine containing one primary amino group, whereas the improving effect is remarkable with the amine having two primary amino groups.

EXAMPLE 2

In each run, the same cis-1,4-polyisoprene rubber as in Example 1 or an epoxy group-containing polyisoprene rubber C [0.2 epoxy group per 100 isoprene units; Mooney viscosity (ML$_{1+4}$, 100° C.) 73] prepared by the same method as in Example 1 was mixed with each of the diamines shown in Table 3 at about 140° C. for 2 minutes in a Brabender plastograph. The resulting mixture was fully mixed with the compounding agents of the carbon black formulation shown in Table 4 excepting sulfur and the vulcanization accelerator in a small-sized Banbury mixer (Laboplastomill made by Toyo Seiki K.K.), and then sulfur and the vulcanization accelerator were added to the mixture on a small-sized roll to give a rubber compound stock (Runs Nos. 20 to 22). The rubber compound stock was press-cured at 145° C. for each of the times shown in Table 3 to form a vulcanized sheet having a thickness of 2 mm, and its tensile properties were measured at room temperature in accordance with JIS K-6301. For the measurement of tear strength, a B-type test specimen was used. Furthermore, the rebound of the sheet was measured in accordance with JIS K-6301.

For comparison, the same test was performed on polyisoprene rubber and natural rubber to which no diamine was added (Runs Nos. 17 to 19).

The results are shown in Table 3.

TABLE 3

| Run No. | Sample rubber | Additive (parts) | Compounding recipe | Vulcanization time (min.) | 300% tensile stress (kg/cm$^2$) | Tensile stress (kg/cm$^2$) | Elongation at break (%) | Tear strength (kg/cm) | Rebound (%) |
|---|---|---|---|---|---|---|---|---|---|
| Comparison | | | | | | | | | |
| 17 | Polyisoprene rubber | — | III | 22 | 125 | 296 | 580 | 75 | 55 |
| 18 | Polyisoprene rubber | — | IV | 21 | 152 | 255 | 470 | 66 | 57 |
| 19 | Natural rubber (RSS#3) | — | III | 22 | 149 | 288 | 530 | 86 | 56.5 |
| 20 | Polyisoprene rubber | Phenylene-diamine (1.0) | III | 16 | 135 | 259 | 510 | 71 | 55 |
| Invention | | | | | | | | | |
| 21 | Epoxy group-containing polyisoprene rubber C | p-Phenylene-diamine (1.0) | III | 15 | 151 | 291 | 520 | 94 | 59.5 |
| 22 | Epoxy group-containing polyisoprene rubber C | m-Phenylene-diamine (0.5) | III | 17 | 143 | 302 | 550 | 87 | 58.5 |

TABLE 4

| (Carbon black formulation) | | |
|---|---|---|
| Compounding agents | Recipe III | Recipe IV |
| Sample rubber | 100 (parts) | 100 (parts) |
| HAF carbon | 50 | 50 |
| Aroma oil | 5 | 5 |
| Zinc oxide | 5 | 5 |
| Stearic acid | 2 | 2 |
| Sulfur | 2.5 | 3.5 |
| N—oxy-diethylene-2-benzothiazyl sulfenamide | 0.8 | 1.1 |
| N—isopropyl-N'—phenyl-p-phenylenediamine | 1.0 | 1.0 |

Table 3 shows that with the same carbon black formulation, the polyisoprene rubber has a lower 300% tensile stress than natural rubber (by a comparison of Run No. 17 with Run No. 19), and when its tensile stress is increased by increasing the amount of the vulcanization system (Run No. 18), its tensile strength and tear strength are reduced. According to this invention (Runs Nos. 21 and 22), vulcanized rubbers having a high tensile stress can be obtained without a consequent reduction in tensile strength and tear strength. Furthermore, it is seen that a high rebound is another characteristic of the vulcanized rubbers in accordance with this invention.

What we claim is:

1. A cis-1,4-polyisoprene rubber composition capable of giving a vulcanizate having improved strength, said composition comprising (1) an epoxidized synthetic cis-1,4-polyisoprene rubber having 0.02 to 1.5 epoxy groups per 100 isoprene monomer units, (2) 0.05 to 3.0 parts by weight of a compound having at least two primary amino groups per 100 parts by weight of the rubber (1), and (3) a sulfur vulcanization system comprised of at least one of sulfur and sulfur-donor compounds.

2. The rubber composition of claim 1 wherein the compound having at least two primary amino groups is a compound selected from the group consisting of ethylene diamine, α,ω-polymethylenediamine, diethylenetetramine, triethylenetetramine, bis-hexamethylene-triamine, pentamethylene-hexamine, menthanediamine, 1,3-diaminocyclohexane, p-phenylene-diamine, 4,4'-diaminodiphenylmethane, 4,4'-diaminodiphenyl ether, 4,4'-diaminodiphenyl sulfone, 3,3'-dichloro-4,4'-diaminodiphenylmethane, polyetherdiamine, polyamide curing agents obtained by reacting diamines with divalent or polyvalent organic acids, and amino acids.

3. The rubber composition of claim 2 wherein the amount of the compound having at least two primary amino groups is from 0.1 to 2.0 parts by weight.

4. The rubber composition of claim 1 wherein the amount of the compound having at least two primary amino groups is from 0.1 to 2.0 parts by weight.

5. The rubber composition of claim 4 wherein the polyisoprene rubber has 0.1 to 1.0 epoxy groups per 100 isoprene monomer units.

* * * * *